Patented June 17, 1930

1,764,869

UNITED STATES PATENT OFFICE

WILLIAM J. HALE, OF MIDLAND, MICHIGAN, ASSIGNOR TO THE DOW CHEMICAL COMPANY, OF MIDLAND, MICHIGAN, A CORPORATION OF MICHIGAN

PREPARATION OF ARYLAMINES

No Drawing. Application filed March 1, 1926. Serial No. 91,622.

The present improvements have more particular regard to the preparation of aryl amines from aryl halides, i. e. from the corresponding halogenated aromatic hydrocarbon by direct reaction with ammonia. While the production of traces of aniline through the interaction of bromobenzene, ammonium carbonate and dry soda lime when heated under pressure for many hours at an elevated temperature was noted a number of years ago (J. f. Prakt. Chem. [2] 48, 465), and while in German Patent No. 204,951 of 1907 the claim is made that an 80 per cent yield in aniline may be obtained by use of certain copper salts as catalysts upon chlorobenzene and aqueous ammonia when heated together under pressure for 20 hours at 180–200 degrees C., and still more recently A. J. Quick (Am. Chem. Soc. 42, 1033) has reported that cuprous salts are more active than the cupric in this reaction, no commercial development of this process of making aniline, so far as I am aware, has ever occurred.

I have now discovered that certain loosely bound derivatives of copper which, under the conditions to which the reaction mixture is subjected, may yield metallic copper will exert a marked influence in promoting the catalytic action of cuprous compounds in producing an aryl amine by direct reaction between the corresponding halide and ammonia. The compounds referred to will now be identified and their constitution explained, so far as ascertainable, the invention consisting of the steps indicated with the detail modifications hereinafter fully described and particularly pointed out in the claims, the following description setting forth but several of the various ways in which the principle of the invention may be used.

The action of reducing agents in alkaline solution upon copper salts gives rise to what is known as copper quadrant-oxide, an olive green precipitate insoluble in ammonia and possessing the formula $Cu_4O$ (Rose, Pogg. Annal. 120, 1 (1863)). This quadrantoxide, as first prepared, is stable only in the absence of air but upon standing becomes compact and then acquires considerable more stability if kept in a moist condition. This product, which we may call a subcuprous oxide, has also been found in the decomposition products of cuprous oxide (Recoura, Compt. Rend. 148, 1105 (1909)).

When now this subcuprous oxide is introduced into the system chlorbenzene plus ammonia, we find that the reaction is much accelerated over that in which cuprous salts and ammonia alone are used. Furthermore, when this subcuprous oxide is added to the same reaction mixture containing already a cuprous compound, the action is found to be likewise accelerated.

In other words, subcuprous oxide appears to function in the fashion of a promoter for this reaction just as has been previously indicated for metallic copper. The explanation may not entirely rest upon the possible decomposition of subcuprous oxide into copper and cuprous oxide, but primarily in the state of oxidation of the copper as exemplified in subcuprous oxide when compared with cuprous compounds. These subcuprous compounds must undoubtedly exert a similar action upon cuprous compounds as does copper, although possibly not to so large an extent. Their production from cuprous compounds in situ is brought about toward the end of the reaction process by the reducing action of aniline, then building up in appreciable quantity.

Subcuprous oxide is readily acted upon by acids to give cuprous salts and copper and, in the case of hydrochloric acid, possibly a subchloride is formed. We are convinced, therefore, that any compound of copper possessing a lower state of oxidation than cuprous compounds must act in a similar manner to subcuprous oxide and, when introduced into the system chlorbenzene plus ammonia, will function better as a catalyst than the cuprous compounds themselves, as even the latter function more advantageously than the cupric compounds, and also will serve as a promoter for the catalytic reaction of cuprous compounds when present. In this latter role, it will be exceedingly difficult to determine to what extent such subcuprous compounds at the temperature of the reaction are actually present as subcuprous compounds or as mixtures of cuprous compounds and metallic copper, wherein the last named possesses a decidedly promoting action.

It has further been discovered that certain copper compounds, in which a non-metallic element, with or without hydrogen, is loosely bound to the copper, may likewise function in some such manner as we have just described. For example, cuprous nitride, $Cu_3N$, is found to be of promoting value upon the catalytic action of cuprous compounds in the system chlorbenzene plus ammonia at temperatures over 200 degrees C.

Cuprous nitride may be prepared by heating ammonia and freshly prepared cuprous oxide at 240 degrees to 260 degrees C. under atmospheric pressure but under higher pressures it is produced at much lower temperatures. Cuprous nitride is a greenish black powder decomposed by dilute acids but only very slowly by alkalis, in the latter case yielding ammonia and cuprous oxide.

In the reaction mixture containing a cuprous compound together with chlorbenzene and ammonia this cuprous nitride may be formed to some extent even at 200 degrees C. The amount present at any one time will vary greatly with the external conditions as the higher the temperature the greater will be its tendency to decompose. Thus prolonged heating of cuprous nitride for two hours in the neighborhood of 200 degrees C. converts it into a deep green product containing apparently no oxide but notable quantities of free copper.

Furthermore, upon cooling the reaction vessel we shall have reformed, to some extent, cuprous nitrides which in turn, owing to their great insolubility, may be readily built up in the system and may serve the same purpose as before. They evidence a tendency to cling to and form a protective coating for the iron walls of the reaction vessel. This decomposition of cuprous nitride into its constituent elements varies greatly, but at 300 degrees C. it takes place with slight explosions. The formation of nitrides of copper in the reaction chambers where cuprous and subcuprous oxides of copper are heated with ammonia can not well be avoided. The presence of water, however, will hold this production to a minimum; yet, owing to the insolubility of the nitrides in water and the slow hydrolysis by the same, the nitrides will gradually accumulate.

As stated, these cuprous nitrides tend to collect as insoluble material, principally as a coating adherent to the walls of the reaction vessel, and as such may advantageously be retained or if they become separated they may be reintroduced into the reaction vessel and so, in either case, function in successive operation. Thus, after two hours boiling with concentrated aqueous caustic soda, only about 10 per cent of cuprous nitride is decomposed into ammonia and cuprous oxide. Whether we have in the action of cuprous nitride upon the reaction mixtures of chlorbenzene and ammonia and cuprous compounds a reaction of the cuprous nitride per se as a promoter in accelerating the catalytic effect of the couprous compounds or in the form of its dissociated products, namely, copper and nitrogen wherein the copper acts as a promoter, is beyond the scope of present proof.

In this same capacity, however, we foresee that all compounds of copper, that, under the conditions of our reaction, are theoretically able to give free copper or a compound of copper of lower oxidation value than that exemplified by the state of oxidation known as cuprous compound, must function in a manner such as to promote to a consequential extent the reaction between chlorbenzene and ammonia in the presence of cuprous compounds. Thus copper hydrides should readily function in the manner indicated and experiment confirms this inference. Compounds of copper and metallic elements which partake more of the nature of alloys are likewise found efficient promoters in the chlorobenzene, ammonia and cuprous compound system.

By way of illustration of my improved method for making arylamines, the following specific example is given of the manufacture of aniline from chlorobenzene and ammonia:—

Chlorobenzene is mixed with a 25 per cent. aqueous ammonia solution in such amount as to furnish about five mol. of anhydrous ammonia to one mol. of the chlorobenzene. This mixture is then charged with catalytic material including 0.1 mol. of a cuprous compound, e. g. cuprous oxide or chloride, and in addition with approximately 0.1 mol. of a loosely bound derivative of copper, such as sub-cuprous oxide, cuprous nitride, or cuprous hydride, or two or more such compounds, into an iron autoclave and the mixture heated to a temperature of approximately 180° C. After heating at this temperature for five or six hours, the temperature is raised to from 200° to 240° C. and there maintained for several hours more. Thereupon the resulting products of the reaction are discharged from the autoclave into a closed vessel for treatment with caustic alkali whereby there is insured the removal first of the ammonia, and then of the aniline, and, the production of a precipitate containing properly reduced copper compounds such as will promote ammonolysis of chlorbenzene by ammonia. Whatever phenol is present in the reaction mixture may be liberated in the usual way.

So far as the present process is concerned, the copper derivatives employed in promoting the reaction may be derived from any source. It may be noted, however, that at least several such derivatives, if not all, will be found in the precipitated copper compounds resulting from the carrying out of the reaction just described above.

The utilization of these copper compounds directly precipitated from the regular reaction mixture may advantageously follow their conversion into soluble form by the aid of ammonia or other reagents. Thus, the corresponding compounds or ammonio-copper salts when so produced will function with surprising efficient results.

In conclusion it may be stated that copper compounds or derivatives of the character hereinbefore described display the same effect in promoting the reaction between aqueous ammonia and other poly-halogenated and substituted benzene hydrocarbons. In other words, it is to be understood that the present improved process is applicable not merely to aniline or phenylamine, $C_6H_5.NH_2$, but to the production of the homologues of aniline or the various arylamines in general, as illustrated by the following examples, viz:—

1. Dichlorobenzene, $C_6H_4Cl_2$, with ammonium cuprous chloride and copper readily yields $C_6H_4(NH_2)_2$, phenylene-diamine.

2. Chlorotoluene, $CH_3C_6H_4Cl$, similarly yields $CH_3C_6H_4NH_2$, toluidine.

3. Chloronaphthalene, $C_{10}H_7Cl$, similarly yields $C_{10}H_7NH_2$, naphthylamine.

4. Chloroanthraquinone, $C_{14}H_7O_2Cl$, similarly yields $C_{14}H_7O_2NH_2$, amino-anthraquinone.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making an arylamine, the step which consists in reacting between the corresponding halogenated aromatic hydrocarbon and ammonia in the presence of a cuprous compound and a sub-cuprous compound.

2. In a method of making an arylamine, the step which consists in reacting between the corresponding halogenated benzene hydrocarbon and ammonia in the presence of a cuprous compound and a sub-cuprous compound.

3. In a method of making aniline, the step which consists in reacting between mono-halogenated benzene and ammonia in the presence of a cuprous compound and a sub-cuprous oxide.

4. In a method of making aniline, the step which consists in reacting between mono-chlorobenzene and ammonia in the presence of a cuprous compound and a sub-cuprous compound.

5. In a method of making an arylamine, the step which consists in reacting between the corresponding halogenated aromatic hydrocarbon and ammonia in the presence of a cuprous compound and a sub-cuprous oxide.

6. In a method of making an arylamine, the step which consists in reacting between the corresponding halogenated benzene hydrocarbon and ammonia in the presence of a cuprous compound and a sub-cuprous oxide.

7. In a method of making aniline, the step which consists in reacting between a monohalogenated benzene and ammonia in the presence of a cuprous compound and a copper compound in a lower state of oxidation.

8. In a method of making aniline, the step which consists in heating in a suitable reaction chamber at a temperature of from 150° to 250° C. and under a corresponding pressure a mixture of mono-halogenated benzene and aqueous ammonia solution, in approximately the proportion of one molecule of the former to five molecules of anhydrous ammonia, in the presence of a cuprous compound and a sub-cuprous compound.

9. In a method of making aniline, the step which consists in heating in a suitable reaction chamber at a temperature of from 150° to 250° C. and under a corresponding pressure a mixture of mono-chlorobenzene and aqueous ammonia solution, in approximately the proportion of one molecule of the former to five molecules of anhydrous ammonia, in the presence of a cuprous compound and a sub-cuprous oxide.

10. In a method of making an arylamine, the step which consists in reacting between the corresponding halogenated aromatic hydrocarbon and ammonia in the presence of a cuprous compound and a copper compound in a lower state of oxidation.

11. In a method of making an arylamine, the step which consists in reacting between the corresponding halogenated aromatic hydrocarbon and ammonia in the presence of two copper compounds, one whereof is a sub-cuprous compound.

12. In a method of making an arylamine, the step which consists in reacting between the corresponding halogenated aromatic hydrocarbon and ammonia in the presence of two copper compounds, one whereof is sub-cuprous oxide.

13. In a method of making aniline, the step which consists in reacting between mono-chlorobenzene and ammonia in the presence of a cuprous compound and a copper compound in a lower state of oxidation.

14. In a method of making aniline, the step which consists in reacting between mono-chlorobenzene and ammonia in the presence of two copper compounds, one whereof is a sub-cuprous compound.

15. In a method of making aniline, the step which consists in reacting between mono-chlorobenzene and ammonia in the presence of two copper compounds, one whereof is sub-cuprous oxide.

16. In a method of making aniline, the step which consists in heating at a temperature of from 150° to 250° C. under pressure, a mixture of monochlorobenzene and aqueous ammonia solution in approximately the proportion of one molecule of the former to five molecules of anhydrous ammonia, in the presence of a cuprous compound and a copper compound in a lower state of oxidation.

Signed by me this 5th day of February, 1926.

WILLIAM J. HALE.